Feb. 11, 1969

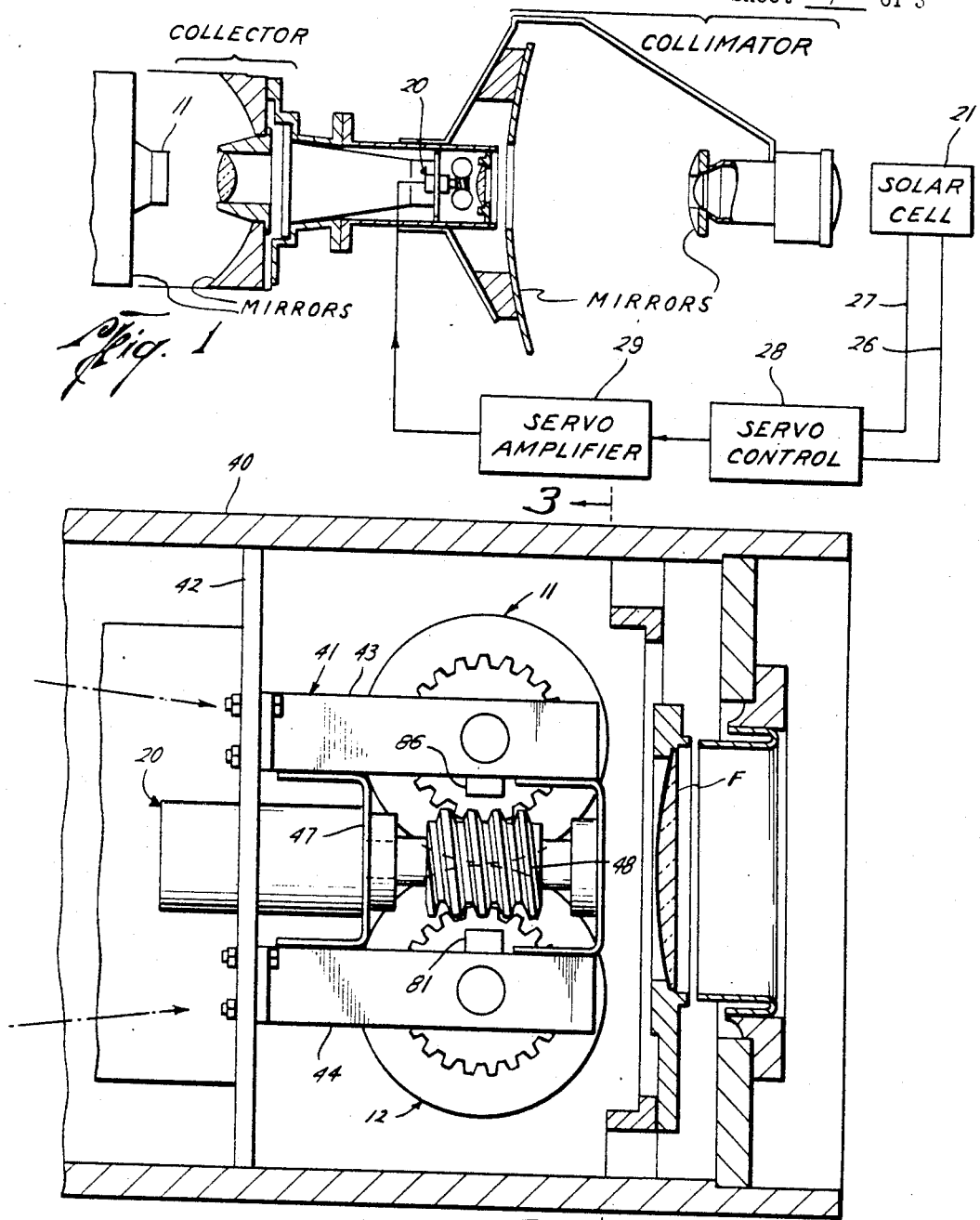

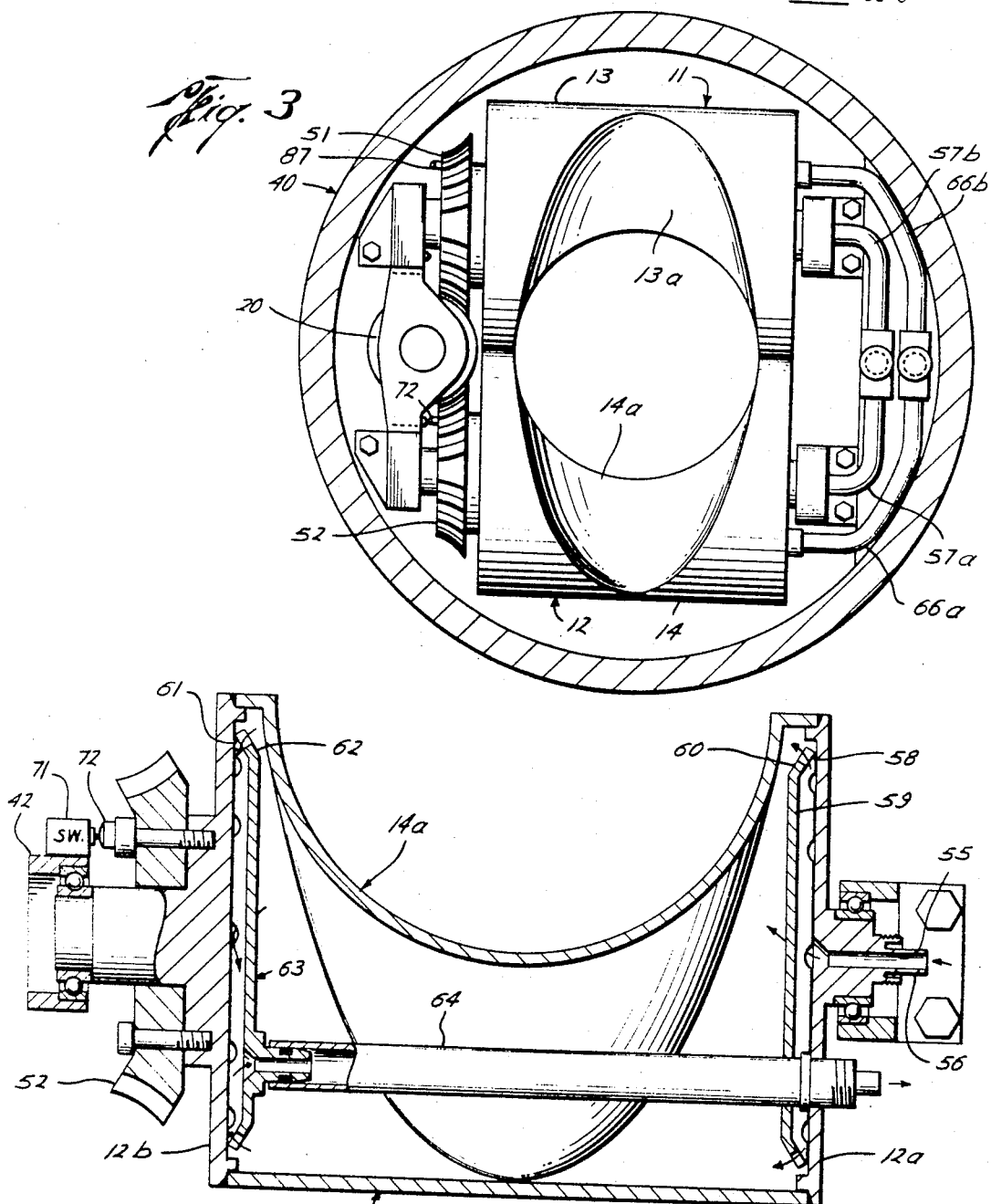

H. K. STRASS ET AL 3,427,093

LIGHT INTENSITY MODULATOR CONTROLLER

Filed Dec. 23, 1965

Herbert K. Strass
Hoyt E. Maples
INVENTORS

BY
ATTORNEYS

United States Patent Office 3,427,093
Patented Feb. 11, 1969

3,427,093
LIGHT INTENSITY MODULATOR CONTROLLER
Herbert K. Strass, Seabrook, and Hoyt E. Maples, Pasadena, Tex., assignors to the United States of America as represented by the Administrator of the National Aeronautics and Space Administration
Filed Dec. 23, 1965, Ser. No. 516,158
U.S. Cl. 350—275        9 Claims
Int. Cl. G02f 1/30

The invention described herein may be manufactured and used by or for the Government of the United States of America for governmental purposes without the payment of any royalties thereon or therefor.

This invention relates to a light intensity modulator, and more particularly to an apparatus for modulating and controlling the intensity of illumination in the beam emanating from a light source as projected in solar simulator units.

The purpose of this invention is to modulate and control the intensity of illumination in light beams emanating from light sources which are associated with high heating rates. The invention may be used with a variety of high intensity sources of thermal, visible, and ultraviolet radiation such as a carbon arc radiant energy source, high pressure xenon or mercury-xenon bulbs, plasma arcs, and other high intensity sources. The modulator of this invention permits continuous variation of the emitted radiant intensity over a range from zero to 100% of the rated intensity. It is also particularly adapted to smooth out radiation intensity fluctuations which are characteristic of radiant energy sources, particularly carbon rod burning.

The prior art light intensity modulators are most inadequate as a means for controlling and modulating the radiation from very high heat light sources such as are presently used in solar simulation equipment. In such equipment the radiant heating conditions existing at the required location for an intensity controller in the optical system of the simulator customarily exceed 230 times the intensity of the incident solar radiation outside of the earth's atmosphere. Conventional apparatus such as the iris diaphragm, aperture plates consisting of perforated discs or slides, and optical filters used for controlling intensity of transmitted light in cameras, projectors, and other optical equipment, are suited for operation in a more benign environment. Adaptation of these devices to extreme heating conditions has thus far proved unsuccessful, principally because no adequate and efficient means have been devised for removing absorbed radiant energy.

Iris diaphragms conventionally employ a plurality of thin metal leaves which are arranged to define a central aperture, the diameter of which is controlled as desired by a multiple-lever actuating mechanism. Iris diaphragm devices require precision manufacture, and since they are relatively delicate mechanisms, the thin metal leaves are prone to warp and twist as a result of thermal distortion when overheated. Also, such a device does not lend itself to liquid cooling. Aperture plates which use perforations of various sizes for adjusting the intensity of a light beam are not adapted to provide continuous variable control, and known variations of this type of apparatus do not lend themselves to utilization in confined areas. Transparent optical filters, which may be either of fixed or variable opacity, tend to modify the character of emitted beam by selective absorption within the filter. For any optical filter the minimum absorption approaches 10% of the transmitted radiation, and thus significantly reduces the energy available in the beam. Presently known transparent media, such as the various kinds of glass or fused quartz, are relatively poor conductors of heat, and the radiant energy absorbed by filters employing these materials tends to accumulate within the filter faster than it can be dissipated, thus leading to ultimate failure.

The light intensity modulator of this invention which has been devised to overcome attendant disadvantages in the prior art devices consists of two or more hollow members in the form of circular cylinders or other surfaces of revolution which rotate about their axes of revolution with surfaces in contact. The contact surface of each hollow member is grooved or deformed inwardly in such a manner that the projection of each member as seen from a direction normal to its axis of rotation reveals an opening of desired shape, such as a semi-circular opening. The deformations or grooves in the contacting surfaces of the two rotatable members define between the members an opening of desired shape such as a circular opening. The grooves are also of continuously variable depth, whereby radiation generated by a radiation source and directed to pass through a focal point aperture defined between the contacting members may be modulated and controlled by rotating the contacting members relative to one another, whereby the size and shape of the aperture therebetween may be varied as desired.

The hollow rotatable contacting members are each also provided with an inlet port and an outlet port and associated means for connecting to a source of cooling medium, either liquid or gaseous, which may be passed through the hollow members for controlling their temperature. Although various types of drive means may be used for rotating the contacting rotatable members, the rotation is made responsive to a conventional servo system for controlling the intensity and modulation of the beam. A light intensity sensor such as a solar cell is interposed in the beam for generating electrical signals representative of beam intensity. A conventional servo control mechanism responds to the variation in sensor signals to energize a servo motor which drives the rotatable members. The rotatable members are thus servo-positioned so that the aperture defined therebetween provides for a light beam of a size and shape which produces a desired intensity.

Other objects and many of the attendant advantages of this invention will be readily appreciated as the same become better understood by reference to the following detailed description when considered in connection with the accompanying drawings in which like reference numerals designate like parts throughout the figures thereof and wherein:

FIG. 1 is a schematic diagram showing a typical application of the light intensity modulator of this invention in a carbon arc solar simulator;

FIG. 2 is a view directed normally to the radiation beam and showing the grooved rotatable members which define the iris opening of the modulator;

FIG. 3 is a side view, partly in section, showing the drive means for rotating the grooved hollow members which define the iris opening;

FIG. 4 is a view, partly in section, through the axis of rotation of one of the hollow rotatable members showing the coolant medium inlet and outlet ports, and the circulation path through the hollow members;

Figure 5:
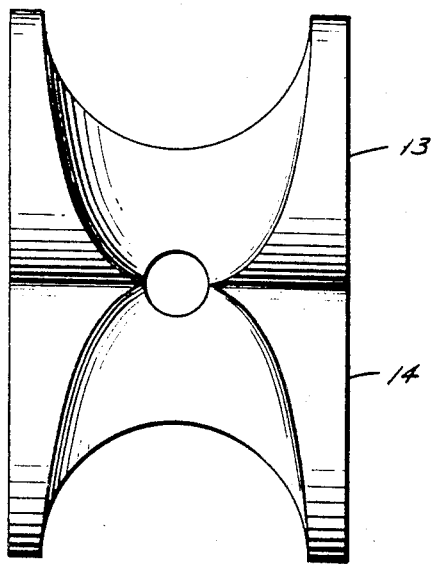
FIG. 5 is a view of the grooved rotatable cylinders of FIG. 2 in a position wherein they define an iris opening of very small size.

Referring more particularly to the drawings, there is shown schematically in FIG. 1 a solar simulator in which the light intensity modulator 10 of this invention is used in a typical application. The modulator is interposed in the radiation beam from a shielded carbon arc source 11, and is located between the collector optics section and the collimating section at the focal point of the simulator.

The modulator may be operated by manual means or by an automatic system for varying the magnitude of the focus region to selectively control the intensity of the beam.

As shown in FIG. 2, the modulator 10 comprises a pair of hollow cylinder members 11, 12 which are rotatable about their cylindrical axes with their cylindrical surfaces 13 and 14, respectively, in direct contact. The cylinders are each provided in their cylindrical surfaces with grooves 13a, 14a which extend almost around the cylinders. Each groove varies uniformly and continuously in depth, and in cross-section defines a semi-circle. As shown in FIG. 2, the cylinders are so positioned relative to one another that their grooved surfaces define a circular opening when viewed in a direction perpendicular to the plane defined by their axes of rotation. As the cylinders are rotated in contact, the size of the circular opening diminishes or increases as the depth of the groove in each cylindrical surface diminishes or increases.

For controlling the intensity of a beam of radiant energy, the modulator 10 is positioned adjacent the focusing lens F directly in the path of light rays projected from a light source, as shown in FIG. 2, with the plane defined by the axes of rotation of the rotatable members disposed perpendicularly thereto. The two rotatable members thereby present a circular opening for the light rays of a diameter determined by their relative rotary positions. Preferably, the cylinders are rotatably positioned by a servo motor such as the reversible motor 20 which responds to a servo controlled feedback system for selectively positioning the cylinders. Variations in intensity of the radiant beam can be practically eliminated through operation of the servo system by enlarging the circular opening as the beam intensity tends to diminish, or by reducing the circular opening as the intensity tends to increase.

The servo system, which may be a conventional type, utilizes a sensor in the form of a solar cell 21 interposed in the light beam "downstream" of the modulator 10. As is well known, the solar cell generates a current proportional to the intensity of the incident beam, which current is used to generate a signal voltage representative of beam intensity.

As shown in FIG. 1, the solar cell signal is fed by conductors 26, 27 to a servo control mechanism 28 which compares the solar cell signal voltage with a reference control voltage and provides an error voltage signal for amplification by the servo amplifier 29. The amplified signal is fed to the servo motor 20 which selectively rotates the iris defining members of the modulator 10.

The rotatable cylinders of the modulator are fabricated of aluminum or other suitable metal, and are mounted within the modulator housing 40, also of metal. The rotatable cylinders are each supported by a U-shaped bracket member 41 which is bolted to an annular support plate 42 mounted transversely of the modulator housing. The annular plate 42 is provided with a central opening of sufficient size to avoid obstruction of the radiation beam. The cylinder 11 is journalled at one end from rotation on the bracket leg 43, and the cylinder 12 is journalled for rotation on the lower bracket leg 44, with their respective axes of rotation disposed parallel to one another and in a plane normal to the incident radiation beam. The servo drive motor 20 is mounted on the annular plate 42 and a vertical support 47 is fixed between the bracket legs 43 and 44. The motor shaft drives a worm gear 48 which cooperably engages bevelled gears 51 and 52 mounted on the cylinders 11 and 12, respectively, in coaxial relation therewith by means of bolts 61.

For dissipating the great amount of heat which is absorbed from the incident rays, the hollow rotatable cylinders are liquid cooled. Since the coolant circulation path for each rotatable cylinder is identical, only the circulation path for one of the cylinders is herein described. As shown in FIG. 4, the cylinder 14 is provided with an inlet in the form of an axial bore 54 extending through the axle 55 affixed to the side wall 12a of the cylinder. The axle 55 is provided at its end with means such as external threads 56 for attaching to a delivery conduit connecting with a source of cooling medium such as the flexible conduit 57a shown in FIG. 2 which connects with a suitable circulating system. The incoming cooling fluid is delivered to the interior of the hollow cylinder by dispersion through a number of apertures 58 disposed circumferentially about the edge of a circular baffle plate 59 located near the interior side wall of the cylinder. The apertures are provided in a circumferential flange 60 of the baffle which engages the side wall of the cylinder, whereby the only path for the cooling fluid into the hollow cylinder is through the apertures 58 whereby the coolant is distributed throughout the interior of the cylinder to provide most effective cooling.

The coolant exits the cylinder through apertures 61 provided on the circumferential flange 62 of a circular baffle plate 63 located adjacent the side wall 12b of the cylinder. The baffle 63 is identical to the baffle 59 in structure and arrangement, but is located adjacent the opposite side of the cylinder. The coolant is returned to the coolant circulating system through an exit conduit 64 which is mounted on the baffle 63 in fluid communication with the apertures 61 through an aperture provided in the baffle. The conduit 64 also extends through the baffle 59 and the side wall 12a of the cylinder, whereby both inlet and outlet connections with the source of coolant medium are made at the same side of the rotatable cylinder. At its outlet end the conduit 64 is externally threaded to provide means for connecting to the return conduit 66a of the coolant medium supply system. The conduits 57a and 66a are fabricated of a flexible plastic or rubber.

As shown in FIG. 3, the rotatable cylinder 13 is similarly connected in fluid communication with a coolant delivery conduit 57b and a coolant return conduit 66b. For purposes of simplification, the two delivery conduits 57a and 57b are preferably joined as branches of a single delivery conduit, and the return conduits 66a and 66b are similarly joined to form a single return conduit. If water is employed as the coolant, the delivery conduits may be connected to a conventional water tap. If a liquid coolant other than water is used, a liquid circulating system and pump may be used.

To effectively stop the rotation of the cylinders in positions where the iris opening is at maximum size, i.e., fully open, a limit switch 71 in the servo motor circuit is mounted atop the bracket leg 44 in position to be actuated by a stop 72 which protrudes from the gear 52. As shown in FIG. 4, the stop 72 engages the limit switch only when the opening for the beam which is provided by the grooves 14a and 13a is at maximum size. The purpose of the limit switch 71 is to prevent oscillation of the cylinders in the event the solar cell or other light intensity sensor demands greater intensity of the radiation beam.

In like manner to the mounting of the switch 71, a limit switch 86 is mounted on the underside of the bracket leg 43 for engagement with a stop 87 associated with the upper rotatable cylinder 13. The switch 86, also included in the servo motor circuit, is operated by the stop 87 to hold the cylinders in a position where the beam opening is fully closed. The purpose of the limit switch 71 is to prevent overriding of the drive gears which would possibly cause 360° rotation, or more, of the cylinders, and twisting or rupture of the coolant supply and return conduits.

In FIG. 5 there is shown the pair of rotatable cylinders 13 and 14 as they are positioned to define a circular opening of very small size.

Figure 6:
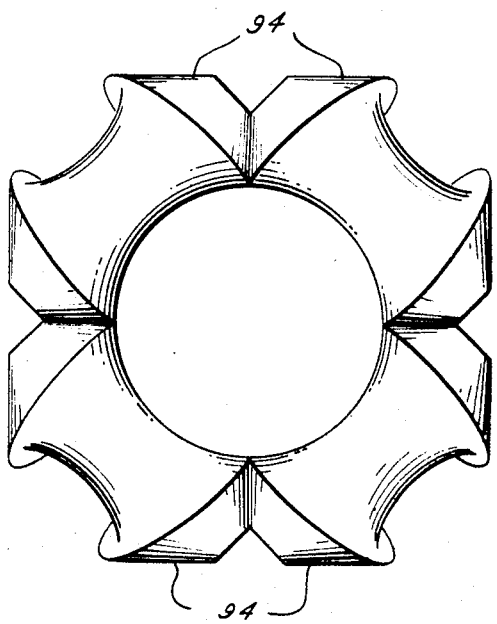
FIGS. 6 and 7 show alternate forms of rotatable members for defining the iris opening.

In FIG. 6 there is shown four hollow rotatable members 94 which could be used in lieu of the cylinders 13 and 14 in the modulator 10 to define the iris opening. Each rotatable member 94 is provided at its ends with conical surfaces which engage conical surfaces of adjacent rotatable members. It is to be noted that the axes of rotation of the members 94 define a geometric square and each groove defines one-quarter of a circle.

Figure 7:
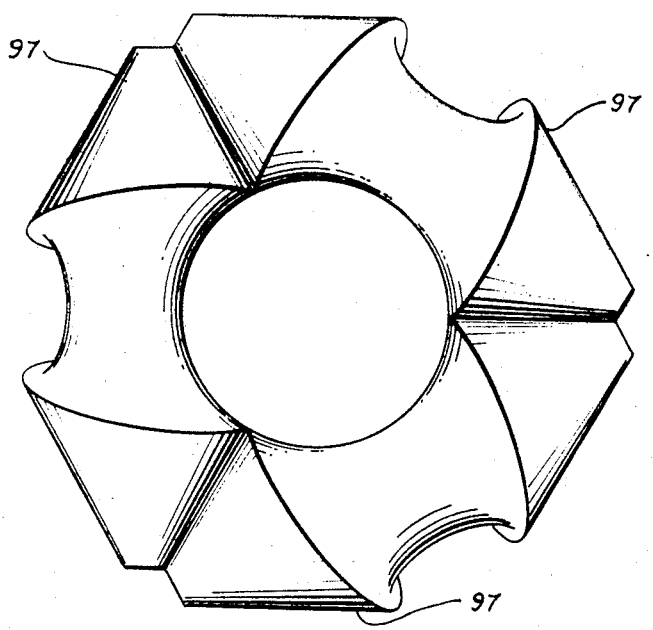

In FIG. 7 three hollow rotatable members 97 are used to define a circular iris opening by the grooves formed in their surfaces.

While the drive gear assemblies for the rotatable members shown in FIGURES 6 and 7 would be more complex than that used for the modulator 10, it would be possible to obtain better cooling by circulating coolant through each rotatable member. With these modified forms of rotatable members it would also be possible to reduce the size of the modulator for a given size of iris opening.

It is also to be noted that although the conduits for delivering coolant to and from the hollow rotatable members have been described as flexible, these could also be made of rigid materials which might be preferred in many applications. A mechanical rotary-seal connection in these conduits would be required. Furthermore, while the iris opening has herein been described as circular, other shapes could be used for special applications by forming the cylinder grooves with appropriate cross-section. Also, to eliminate the possibility of light passing between the cylindrical surfaces, these might be provided with longitudinal grooves extending lengthwise of the cylinders in a manner to provide interlocking teeth for the cylinders.

It will therefore be seen that a novel light intensity modulator is described herein which is particularly adapted for modulating and controlling the intensity of illumination in a radiation beam emanating from a radiation source having a high heating rate.

The modulator is particularly suited for smoothing out the radiation intensity fluctuations which are characteristic of practically all light sources. Although the modulator has been particularly described in an application where it is desired to maintain a given level of intensity, the device could also be used to continuously vary the emitted radiation intensity over a range from zero to 100% of the rated intensity of the source. A computer means might, therefore, be used in lieu of the limit switches in the servo control system described above.

It should also be understood that the foregoing disclosure relates only to preferred embodiments of the invention, and that it is intended to cover all changes and modifications of the examples in the invention herein chosen for the purposes of the disclosure and which do not constitute departure from the spirit and scope of the invention.

What is claimed and desired to be secured by Letters Patent is:

1. An apparatus for controlling the intensity of a light beam produced by a light source characterized by high heating rates, said apparatus comprising:
    a pair of elongate, hollow members, each journalled for rotation about its longitudinal axis and defining a closed chamber having an external surface of revolution, said hollow members being disposed with their longitudinal axes parallel and their external surfaces in engagement, each said external surface being provided with a groove of varying depth and of semi-circular cross section extending in a circumferential direction at least part way around the hollow member, said grooves being identical in configuration and disposed by the arrangement of hollow members in a conjugate relationship, whereby a circular aperture is defined by the grooves in the plane which includes their axes of rotation;
    drive means for simultaneously rotating said hollow members at equal rates in opposite directions of rotation, said drive means being reversible and adapted to reverse the rotation of the hollow members; and
    means for controlling said drive means to selectively adjust the rotary positions of said hollow members, whereby the intensity of a light beam may be modulated by varying the size of the aperture defined by said grooves when the hollow members are interposed in a light beam with said aperture adjacent the focal point of the light beam.

2. An apparatus for controlling the intensity of a light beam substantially as described in claim 1, further including:
    inlet means for each said hollow member adapted to be connected to the delivery conduit of a coolant fluid circulating system; and
    outlet means for each said hollow member adapted to be connected to the return conduit of said coolant fluid circulating system whereby a coolant fluid may be circulated through the hollow members to dissipate the heat generated in the hollow members when said hollow members are placed in a light beam.

3. An apparatus for controlling the intensity of a light beam produced by a light source characterized by high heating rates, said apparatus comprising:
    a pair of elongate, hollow members, each journalled for rotation about its longitudinal axis and defining a closed chamber having an external surface of revolution, said hollow members being disposed with their longitudinal axes parallel and their external surfaces in engagement, each said external surface being provided with a groove of varying depth and of semi-circular cross section extending in a circumferential direction at least part way around the hollow member, said grooves being identical in configuration, and disposed by the arrangement of hollow members in a conjugate relationship, whereby a circular aperture is defined by the grooves in the plane which includes their axes of rotation;
    drive means for simultaneously rotating said hollow members at equal rates in opposite directions of rotation, said drive means being reversible and adapted to reverse the rotation of the hollow members;
    sensor means for sensing the intensity of a light beam directed through the aperture provided by said grooves; and
    servo means responsive to said sensor means for adjusting the size of the aperture definined by said grooves by selectively rotating said hollow members in order to maintain a constant intensity of said light beam.

4. An apparatus for controlling the intensity of a light beam substantially as described in claim 3, further including:
    inlet means for each said hollow member adapted to be connected to the delivery conduit of a coolant fluid circulating system; and
    outlet means for each said hollow member adapted to be connected to the return conduit of said coolant fluid circulating system whereby a coolant fluid may be circulated through the hollow members to dissipate the heat generated in the hollow members when said hollow members are placed in a light beam.

5. An apparatus for controlling the intensity of a light beam produced by a light source associated with high heating rates, said apparatus comprising:
    a plurality of elongate hollow members each defining a closed chamber with an external surface of revolution and journalled for rotation about its longitudinal axis, said hollow members being arranged with their axes of rotation coplanar, each said external surface being provided with a groove of varying depth of predetermined cross section extending in a circumferential direction at least part way around the hollow member, said grooves being identical in configuration and disposed by the arrangement of said hollow members in conjugate relationship, whereby an aperture of predetermined shape is defined by the grooves in the plane which includes their axes of rotation;

drive means for simultaneously rotating said hollow members at equal rates, said drive means being reversible and adapted to reverse the rotation of the hollow members; and means for controlling said drive means to selectively adjust the rotary positions of said hollow members, whereby the intensity of a light beam may be modulated by varying the size of the aperture defined by said grooves when the hollow members are interposed in a light beam with said aperture adjacent the focal point of the light beam.

6. An apparatus for controlling the intensity of a light beam, substantially as described in claim 5, and further including:

inlet means for each said hollow member adapted to be connected to the delivery conduit of a coolant fluid circulating system; and outlet means for each said hollow member adapted to be connected to the return conduit of said coolant fluid circulating system whereby a coolant fluid may be circulated through the hollow members to dissipate the heat generated in the hollow members when said hollow members are placed in a light beam.

7. An apparatus for controlling the intensity of a light beam produced by a light source associated with high heating rates, said apparatus comprising:

a plurality of elongate hollow members, each defining a closed chamber with an external surface of revolution and journalled for rotation about its longitudinal axis, said hollow members being arranged with their axes of rotation coplanar, each said external surface being provided with a groove of varying depth of predetermined cross section extending in a circumferential direction at least part way around the hollow member, said grooves being identical in configuration and disposed by the arrangement of said hollow members in conjugate relationship, whereby an aperture of predetermined shape is defined by the grooves in the plane which includes their axes of rotation;

drive means for simultaneously rotating said hollow members at equal rates, said drive means being reversible and adapted to reverse the rotation of the hollow members;

sensor means for sensing the intensity of a light beam directed through the aperture provided by said grooves; and servo means responsive to said sensor means for controlling said drive means to selectively adjust the rotary positions of said hollow members and the size of the aperture defined by said grooves to maintain a constant intensity of said light beam.

8. An apparatus for controlling the intensity of a light beam, substantially as described in claim 7, further including:

inlet means for each said hollow member adapted to be connected to the delivery conduit of a coolant fluid circulating system; and outlet means for each said hollow member adapted to be connected to the return conduit of said coolant fluid circulating system, whereby a coolant fluid may be circulated through the hollow members to dissipate the heat generated in the hollow members when said hollow members are placed in a light beam.

9. An apparatus for controlling the intensity of a light beam, substantially as described in claim 8, wherein said sensor means is a solar cell.

References Cited

UNITED STATES PATENTS 2,204,864 6/1940 Michaelsen.
3,088,633 5/1963 Glaus.

JEWELL H. PEDERSEN, *Primary Examiner.*

ORVILLE B. CHEW, *Assistant Examiner.*

U.S. Cl. X.R.

95—64; 352—208